United States Patent
Katakura et al.

[11] Patent Number: 6,085,136
[45] Date of Patent: Jul. 4, 2000

[54] TORQUE CONVERTER LOCKUP STRATEGY

[75] Inventors: Shusaku Katakura, Kanagawa; Hisaaki Toujima, Yokohama, both of Japan

[73] Assignee: Nissan Motor Co., Ltd., Yokohama, Japan

[21] Appl. No.: 09/008,310

[22] Filed: Jan. 16, 1998

[30] Foreign Application Priority Data

Jul. 26, 1996 [JP] Japan ................................ 8-197760
Jan. 17, 1997 [JP] Japan ................................ 9-006356

[51] Int. Cl.$^7$ .............................. G06F 19/00; F16H 59/00
[52] U.S. Cl. .............................. 701/51; 701/58; 701/53; 701/64; 477/45; 477/46; 477/44; 477/48; 477/169; 477/62; 477/118; 192/3.3; 192/331; 192/0.076
[58] Field of Search .................... 701/51, 53, 58, 701/64; 477/46, 45, 44, 48, 169, 62, 118; 192/331, 3.3, 0.076

[56] References Cited

U.S. PATENT DOCUMENTS

| | | |
|---|---|---|
| 4,680,992 | 7/1987 | Hayasaki et al. .................... 74/869 |
| 4,730,521 | 3/1988 | Hayasaki et al. .................... 74/867 |
| 5,086,894 | 2/1992 | Iizuka et al. ....................... 192/3.29 |
| 5,219,055 | 6/1993 | Imamura ............................ 192/0.075 |
| 5,507,372 | 4/1996 | Boardman et al. ................. 192/3.31 |
| 5,588,937 | 12/1996 | Kono et al. ......................... 477/169 |
| 5,643,136 | 7/1997 | Kono et al. ......................... 477/169 |

*Primary Examiner*—William A. Cuchlinski, Jr.
*Assistant Examiner*—Olga Hernandez
*Attorney, Agent, or Firm*—Foley & Lardner

[57] ABSTRACT

According to a torque converter lockup control, a lockup actuator, including a lockup solenoid, is operative responsive to an output command signal issued by a controller to adjust lockup clutch engagement force to a commanded value. The lockup clutch engagement force is a force with which the lockup clutch is engaged. The controller determines the commanded value as a function of a deviation between a current value of slip speed within the torque converter and a desired value thereof. For preventing the lockup clutch from shifting deeply into its converter position when the deviation persists to stay in the neighborhood of zero, the controller sets a limit to the determined commanded value during operation of the lockup clutch in the slip lockup mode.

36 Claims, 9 Drawing Sheets

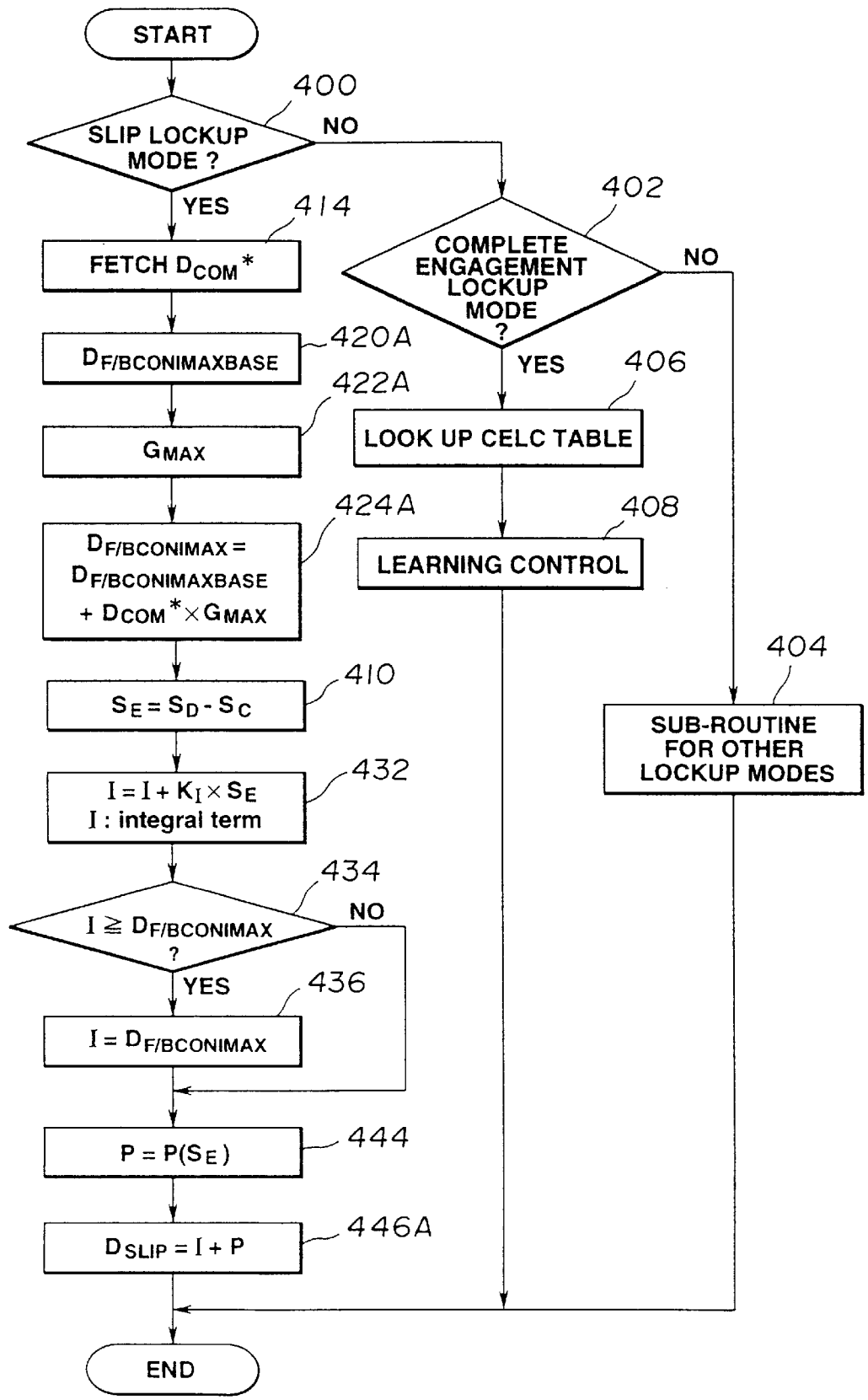

TORQUE CONVERTER LOCKUP STRATEGY

CROSS-REFERENCE TO RELATED APPLICATION

Reference is made to JP Patent Application Serial No. 9-6356 filed Jan. 17, 1997, which is hereby incorporated by reference in its entirety.

FIELD OF THE INVENTION

The present invention relates to a system for and a method of controlling operation of a torque converter lockup clutch. In particular, the present invention relates to an automated vehicular transmission system of the type including an internal combustion engine, an automatic transmission, a torque converter interposed between the engine and the transmission, a torque converter lockup clutch and a controller.

BACKGROUND OF THE INVENTION

Conventionally, a computer-based controller determines a current value of slip speed by calculating a difference between an engine speed and a turbine speed. The controller stores a retrievable desired slip speed table. This table contains desired values of slip speed mapped against various operating states of an automotive vehicle. These values are predetermined to meet torque multiplication demand and torque-variation suppression demand required for varying vehicle-operating state. The controller inputs information as to variables, such as engine speed, throttle position and vehicle speed, that describe current operating state of the vehicle and performs a table look-up operation of the desired slip speed table based on the input variable to determine a desired value of slip speed. It calculates a deviation between the current value of the slip speed and the desired value thereof. The controller alters a signal that provides a control authority over torque transmission by the lockup clutch in such a direction as to reduce the deviation toward zero.

Let us suppose that the vehicle travels with very low lead, that is, the vehicle travels with little engine output torque against low running resistance. In this operation state of the vehicle, the lockup clutch is released and thus there is no clutch engagement force with which the lockup clutch is engaged. However, the torque converter transmits torque with a slip speed in the neighborhood of zero. This phenomenon derives from the structure of the torque converter.

Let us now consider how the controller acts on the torque converter lockup clutch when the vehicle travels in the above-mentioned state.

As a current value of slip speed remains deviated from a desired value thereof, the controller keeps issuing a command that the clutch engagement force should drop. In response to this command, the lockup clutch engagement force drops to zero and the lockup clutch comes into its completely released position.

In order to save fuel when the vehicle is decelerating, the controller is programmed to operate the lockup clutch in complete engagement lockup mode. In the complete engagement lockup mode, the controller calculates the minimum clutch engagement force required to keep the lockup clutch engaged without inducing any slip. Considering a shift from the above-mentioned vehicle operation with very low load to the vehicle operation at deceleration, the lockup clutch has to move from the completely released position to a position whereat the complete engagement lockup mode begins. This travel of the lockup clutch accounts for a considerably long time taken until the initiation of the complete engagement lockup mode at deceleration. Fuel saving is not expected during this period of time. It would therefore be desirable to eliminate or at least shorten this transient period for increased fuel saving expected in the complete engagement lockup mode at deceleration.

Let us assume that the vehicle operator stamps on a gas pedal to accelerate the vehicle from the above-mentioned vehicle operation with very low load. In this case, the depression of gas pedal causes a temporal increase in a current value of slip speed. In order to restrain the current value of slip speed from increasing, the controller increases lockup clutch engagement force so as to reduce deviation between the current value of slip speed and a desired value thereof. In this process, the lockup clutch has to move from the completely released position to a position whereat the desired value of slip speed is accomplished. Thus, there occurs a period of time in which there is no gain in fuel saving expected by operation of lockup clutch in slip lockup mode for acceleration.

Closed loop or feedback control is known in which a slip error or deviation between a current value of slip speed and a desired value thereof is time integrated. According to this control, the absolute value of the result of time integration progressively increases infinitely when the vehicle travels with very low load.

With the feedback control including the integral term, as the absolute value of the integral term increases when the vehicle travels with very low load, the lockup clutch takes its completely released position. Thus, for a shift from the above-mentioned vehicle operation to vehicle operation at deceleration, the lockup clutch has to move from the completely released position to a position whereat the complete engagement lockup mode begins. Thus, the feedback control does not provide a solution to this problem.

Let us now assume that the vehicle operator stamps on a gas pedal to accelerate the vehicle from the vehicle operation with very low load. This causes an increase in current value of slip speed. Thus, the deviation of the current value of slip speed from a desired value thereof becomes negative. Even when the deviation becomes negative, if a current value resulting from integrating the deivation is sufficiently greater than the deviation, it takes a considerable time for the result of integration to sufficiently converge into a normal controllable region. During this transient period, the controller cannot perform any adjustment of current value of slip speed to a desired value thereof. Thus, it takes a considerably long time until occurrence of clutch engagement force with which the lockup clutch is engaged. As the period of time during which the current value of slip speed deviates from the desired value thereof is considerably long, the fuel saving is not improved as much as expected by operation of the torque converter in the slip control mode.

It is conceivable to map desired values of slip speed on a surface representing a change in running resistant to which the vehicle is subject and alters the desired values in accordance with variation of running resistance. Even if this method is employed, it is very difficult to eliminate uncontrollable region where current value of slip speed stays in the neighborhood of zero.

An object of the present invention is to improve a torque converter lockup control system such that the above-mentioned transient period is eliminated or at least minimized.

SUMMARY OF THE INVENTION

According to one aspect of the present invention, there is provided a lockup control system for a vehicle power train including an internal combustion engine, an automatic transmission, a torque converter interposed between the engine and the transmission, a torque converter lockup clutch interposed between the engine and transmission and having a complete engagement lockup mode for vehicle operation at deceleration wherein the lockup clutch is completely engaged to prevent the torque converter from slipping, and a slip lockup mode wherein the lockup clutch is incompletely engaged to restrain the torque converter from slipping, sensors providing input signals indicative of vehicle power train operating parameters, a controller receiving the input signals and processing same in accordance with predetermined logic rules to issue an output command signal and a lockup actuator operative responsive to the output command signal to adjust lockup clutch engagement force with which the lockup clutch is engaged to a commanded value, wherein:

the controller determines the commanded value as a function of a deviation between a current value of slip speed within the torque converter and a desired value thereof;

the controller sets a limit to the determined commanded value during operation of the lockup clutch in the slip lockup mode.

According to a specific aspect of the present invention, controller defines said limit by a lower limit value of range of values of lockup clutch engagement force predetermined for operation of the lockup clutch in the slip lockup mode.

According to a further specific aspect of the present invention, during operation of the lockup clutch in the lockup slip mode, the controller sets, as said lower limit value, the determined commanded value that has caused the lockup actuator to adjust the lockup clutch engagement force to the minimum value required to keep the lockup clutch completely engaged during operation of the lockup clutch in the complete engagement lockup mode for operation of the vehicle at deceleration.

According to another further specific aspect of the present invention, during operation of the lockup clutch in the lockup slip mode, said controller determines a F/B control minimum base as a function of a desired value of slip speed that is predetermined for a current value of vehicle speed, modifies said determined F/B control minimum base by the product of a gain and the determined commanded value, which has caused the lockup actuator to adjust the lockup clutch engagement force to the minimum value required to keep the lockup clutch completely engaged during operation of the lockup clutch in the complete engagement lockup mode for operation of the vehicle at deceleration, and sets the modification result as said lower limit value.

According to still another further aspect of the present invention, during operation of the lockup clutch in the slip lockup mode, said controller modifies the determined commanded value, which has caused the lockup actuator to adjust the lockup clutch engagement force to the minimum value required to keep the lockup clutch completely engaged during operation of the lockup clutch in the complete engagement lockup mode for operation of the vehicle at deceleration, by an offset from the F/B control minimum base that has been determined as a function of a desired value of slip speed that is predetermined for a current value of vehicle speed.

According to another aspect of the present invention, there is provided a lockup control system for a vehicle power train including an internal combustion engine; an automatic transmission; a torque converter interposed between the engine and the transmission; a torque converter lockup clutch interposed between the engine and transmission and having a complete engagement lockup mode for vehicle operation at deceleration wherein the lockup clutch is completely engaged to prevent the torque converter from slipping, and a slip lockup mode wherein the lockup clutch is incompletely engaged to restrain the torque converter from slipping; sensors providing input signals indicative of vehicle power train operating parameters; a controller receiving the input signals and processing same in accordance with predetermined logic rules to issue an output command signal; and a lockup actuator operative responsive to the output command signal to adjust lockup clutch engagement force with which the lockup clutch is engaged to a commanded value, wherein:

the controller determines the commanded value as a function of time integral of a deviation between a current value of slip speed within the torque converter and a desired value thereof;

the controller sets a limit to the time integral during operation of the lockup clutch in the slip lockup mode.

BRIEF DESCRIPTION OF THE DRAWINGS

FIG. 8 is a flow chart of a fourth preferred implementation of the present invention.

DESCRIPTION OF THE PREFERRED EMBODIMENTS

Figure 1A:
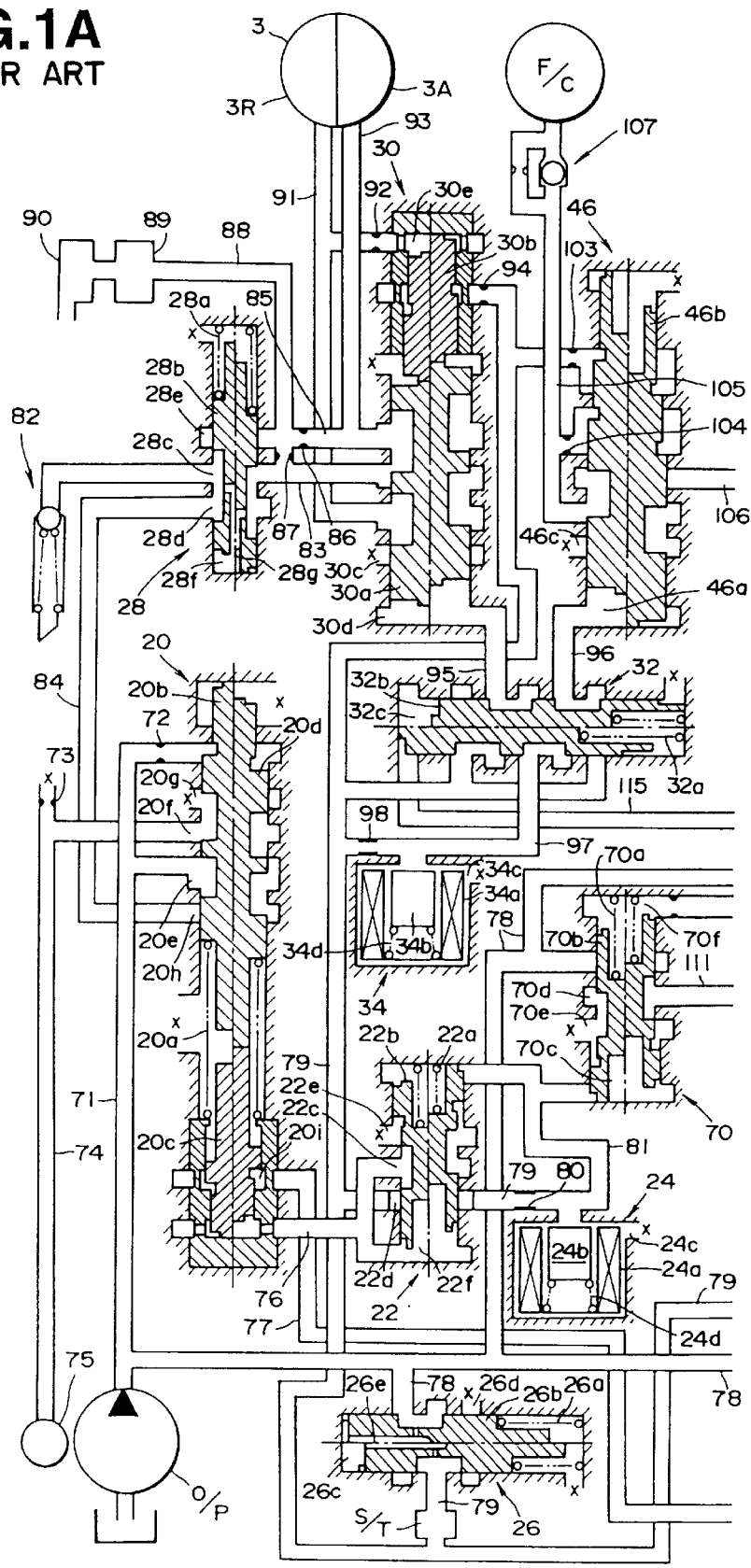
FIGS. 1A, 1B and 1C, when combined side by side, illustrate a hydraulic circuit for a torque converter with a lockup clutch and an automatic transmission.
Figure 1B:
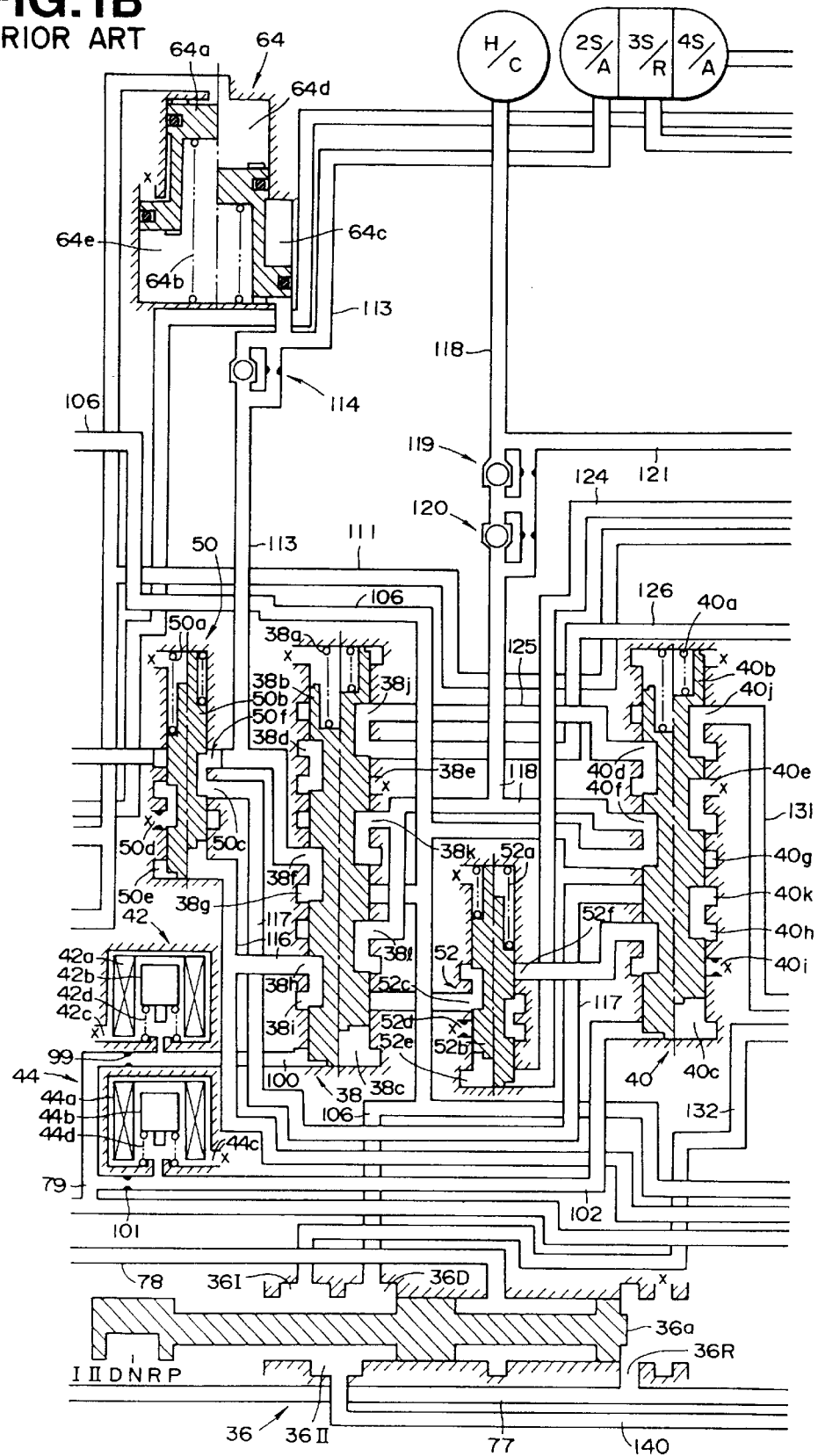
Figure 1C:
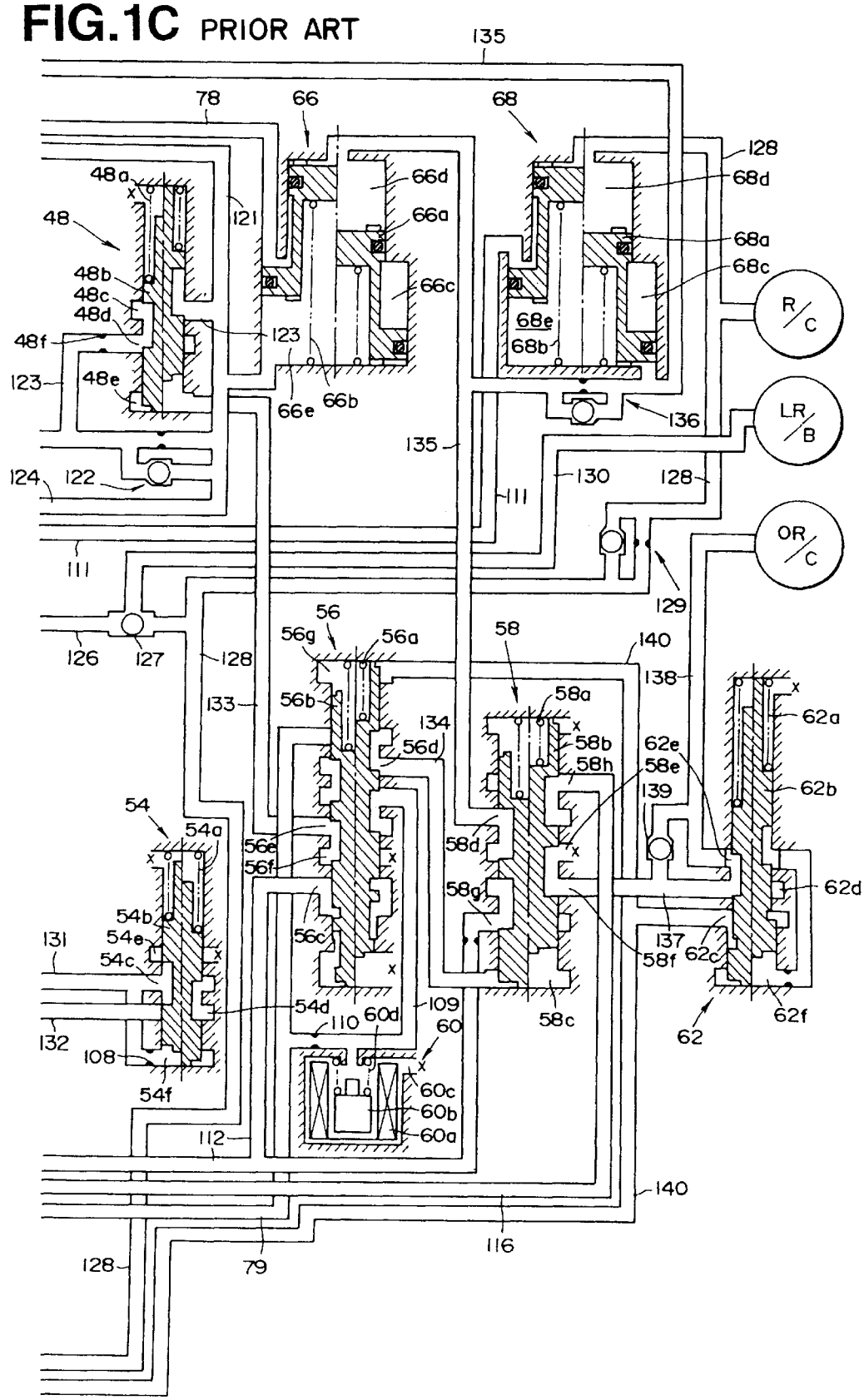
Figure 2:
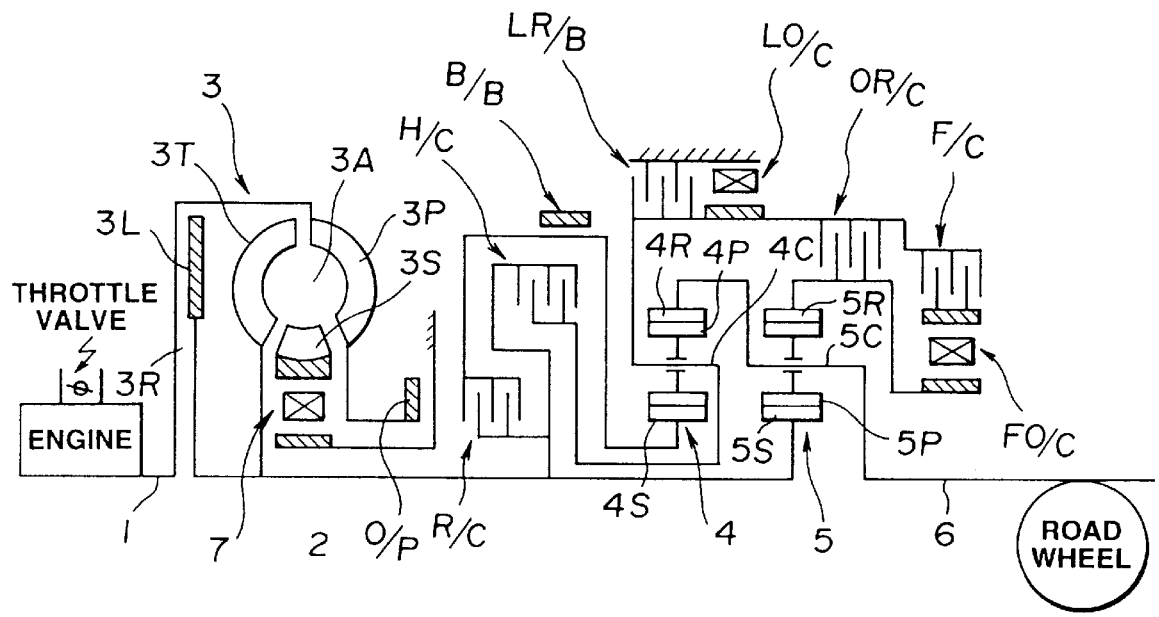
FIG. 2 is a schematic view of a gearbox of the automatic transmission disposed between the torque converter driven by an engine and vehicular road wheel.
Figure 3:
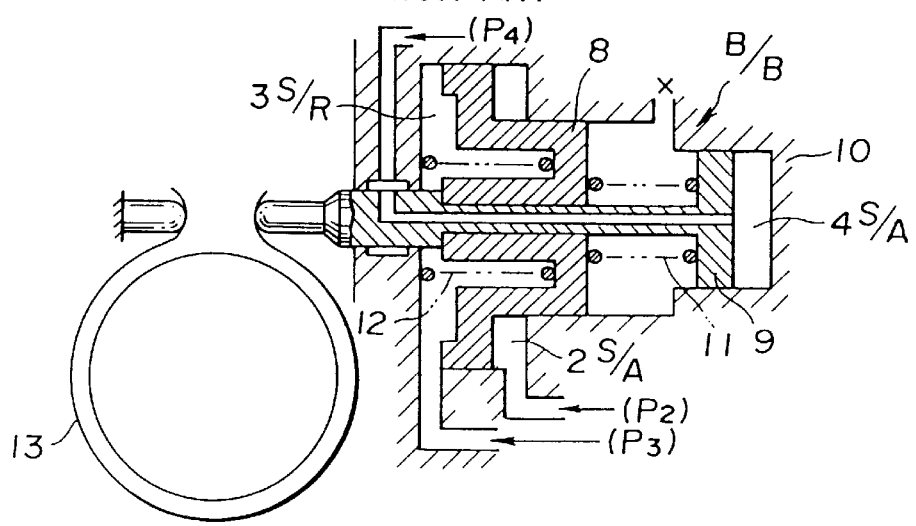
FIG. 3 is a schematic sectional view of a band brake of the gearbox.

Referring to FIGS. 1A, 1B, 1C, 2, and 3, there are illustrated an engine with a throttle valve that opens in degrees. In FIG. 2, the engine has an output shaft 1. Disposed between the engine output shaft 1 and a turbine or input shaft 2 is a torque converter 3. As usual, the torque converter 3 includes a pump impeller 3P drivingly connected to the engine output shaft 1, a turbine runner 3T drivingly connected to the turbine shaft 2, and a stator 3S situated between the pump impeller 3P and the turbine runner 3T. The torque converter 3 also includes a lockup or bridge clutch 3L. The lockup clutch 3L is engaged to mechanically connect the pump impeller 3P with the turbine runner 3T, thus eliminating slip between them. This operation mode is effective for fuel saving. In addition to the complete engagement lockup mode, the lockup clutch 3L is operable in a slip lockup mode. The lockup clutch 3 begins to move toward a disengaged or released position when hydraulic fluid is supplied to the release chamber 3R and hydraulic fluid is discharged from an apply chamber 3A. Movement of the lockup clutch 3 toward engaged position is initiated when hydraulic fluid is supplied to the apply chamber 3A and hydraulic fluid is discharged from the release chamber 3R.

Referring to FIG. 1A, a pump O/P, a regulator valve 20, a pilot valve 26, a torque converter regulator valve 28, a lockup control valve 30, a shuttle or switch valve 32, and a lockup solenoid 34 are provided. Duty of the lockup solenoid 34 is variable in response to a duty signal D. The regulator valve 20 effects regulation of hydraulic fluid discharged by the pump O/P and generates a line or system pressure for distribution through pressure lines 71 and 78 to the pilot valve 26. During the pressure regulation in the regulator valve 20, a portion of hydraulic fluid is discharged from a port 20h. This hydraulic fluid pressure is distributed through a pressure line 84 to the torque converter regulator valve 28. The pilot valve 26 effects pressure regulation and generates a pilot pressure for distribution through a pressure line 79 to the lockup control valve 30 for the purpose of suppressing hunting of a spool 30a, and also to a forward clutch control valve 46 for the same purpose. The pilot pressure is a constant pressure lower than the line pressure. The pilot pressure is delivered toward the lockup solenoid 24 (see FIG. 1A), and toward first and second shift solenoids 42 and 44 (see FIG. 1B), and toward an overrunning clutch solenoid 60 (see FIG. 1C).

The shuttle valve 32 has a chamber 32c. This chamber 32c communicates through a pressure line 115 with a pressure line 113 that provides communication between a first shift valve 38 and a second speed servo apply chamber 2S/A. The first shift valve 38 is operatively associated with the first shift solenoid 42 and responsible for a shift between first speed ratio and second speed ratio. Thus, pressure within the chamber 32c is as high as pressure within the chamber 2S/A. Hydraulic pressure as high as the line pressure prevails in the chamber 2S/A during forward travel with second, third and fourth speeds. Under this condition, the shuttle valve 32 takes a position as illustrated by an upper half thereof, viewing in FIG. 1A. In this position, the shuttle valve 32 provides communication between pressure line 97 from the lockup solenoid 34 and a pressure line 95 communicating with a chamber 30d of the lockup control valve 30. During forward travel with the first speed, as the chamber 2S/A is drained, the hydraulic pressure within the chamber 32c is sufficiently low to allow the lockup control valve 30 to take a lower half thereof, as viewed in FIG. 1A. In this position, the shuttle valve 32 provides communication between the pressure line 97 from the lockup solenoid 34 and a pressure line 96 communicating with a chamber 46a of the forward clutch control valve 46.

Thus, the lockup solenoid 34 has an authority over the forward clutch control valve 46 during forward travel with the first speed, and over the lockup control valve 30 during forward travel with the second, third and fourth speeds.

Converter pressure generated by torque converter regulator valve 28 is supplied via a pressure line 83 to the lockup control valve 30. Assuming now that the vehicle travels forward with second, third and fourth speed, there occur cases which require complete disengagement of the lockup clutch 3L for the torque converter 3 to operate in a torque converter mode. In such cases, duty (%), i.e., a proportion of duty-on period within a unit time, of the lockup solenoid 34 is adjusted to a small value. Periodic operation of the lockup solenoid 34 with such small duty sufficiently restricts discharge flow of hydraulic fluid from the pressure line 97 via a drain opening. This causes the hydraulic pressure within the pressure line 97 to increase to a high level that is slightly below the pilot pressure. This hydraulic pressure is applied to the chamber 30d of the lockup control valve 30. It is high enough to hold a spool 30a in a position as illustrated by its right half, viewing in FIG. 1A, establishing a fluid path from the converter regulator valve 28 to the lockup release chamber 3R via pressure lines 83 and 91. Thus, the lockup clutch 3L is completely disengaged. Let us now consider cases that require complete engagement of the lockup clutch 3L for the torque converter 3 to perate in a lockup mode. In these cases, the duty of the lockup solenoid 34 is adjusted to a large value. Periodic operation of the lockup solenoid 34 with such large duty least restricts the discharge of hydraulic fluid from the pressure line 97. This causes a drop in the hydraulic pressure within the pressure line 97. This hydraulic pressure is low enough to allow the spool 30a to uncover a drain port 30c, so that hydraulic fluid is discharged from the lockup release chamber 3R via pressure line 91 and drain port 30c. Thus, the lockup clutch 3L is completely engaged.

During operation of the torque converter 3 is slip lockup mode, a desired value of slip speed is selected in response to the vehicle speed. To accomplish the desired value of slip speed, clutch engagement force with which the lockup clutch 3L is engaged is adjusted by altering the duty of the lockup solenoid 34 within a window between the large and small values. The window is constituted by a set of values of the duty, which correspond to a set of values of the clutch engagement force induced thereby. The upper and lower limits of the window are determined by one and the other of upper and lower limits of the set of values of the clutch engagement force, respectively. In this embodiment, the upper and lower limits of the set of values of the clutch engagement force determine the upper and lower limits of the window, respectively. In other words, the duty within the window is proportional to the lock-up clutch engagement force.

In setting a lockup clutch engagement force command, it is the common practice to provide a first range of values of the command to which the system responds, thus developing the lockup clutch engagement force falling in a range defined by the upper and lower limits thereof. This first range may be named as an active band. There is also provided a second range of values of the command to which the system does not respond, thus developing no clutch engagement force. This second range may be named as a lower dead band. There is further provided a third range of values of the command to which the system does not respond, thus keeping the clutch engagement force at the upper limit thereof. This third range may be named as an upper dead band. Thus, if the maximum value of the lower dead zone is set as the command, no clutch engagement force is developed although the system is ready to develop clutch engagement force.

As mentioned before, the first shift valve 38 is operatively associated with the first shift solenoid 42. The second shift solenoid 44 is operatively associated with a second shift value 40. The first and second shift solenoids 42 and 44 are energized or turned-on to close drain openings of pressure lines 100 and 102, respectively. Under this condition, hydraulic pressure in the pressure line 100 and that in the pressure line 102 are as high as the pilot pressure. The hydraulic pressure as high as the pilot pressure develops in chambers 38c and 40c of the first and second shift valves 38 and 40, holding spools 38b and 40b in positions as illustrated by their right halves viewing in FIG. 1B. For a shift up to the second speed, the first shift solenoid 42 is de-energized or turned-off with the second shift solenoid 44 lift turned-on to open the drain opening of the pressure line 100. This causes discharge of hydraulic fluid from the chamber 38c via the pressure line 100, allowing a spring 38a to move the spool 38b to a position as illustrated by its left half viewing in FIG. 1B. For a shift from the second speed up to the third speed, the second shift solenoid 44 is turned-off, too, to open the drain opening of the pressure line 102. This causes discharge of hydraulic fluid from the chamber 40c via the pressure line 102, allowing a spring 40a to move the spool 40b to a position as illustrated by its left half thereof viewing in FIG. 1B. For a shift from the third speed up the fourth speed, the first shift solenoid 42 is turned-on with the second shift solenoid 44 left turned-off. The hydraulic pressure within the chamber 38c increases up to a level as high as the pilot pressure, moving the spool 38b to the position as illustrated by its right half thereof against the spring 38a.

Further detailed description of FIGS. 1A, 1B, 1C, 2 and 3, reference should be made to U.S. Pat. No. 4,680,992 issued on Jul. 21, 1987, which has been incorporated herein by reference in its entirety. Particular attention should be paid to the description in connection with FIGS. 1A, 1B, 1C, 2 and 3 of the incorporated U.S. Patent.

Figure 4:
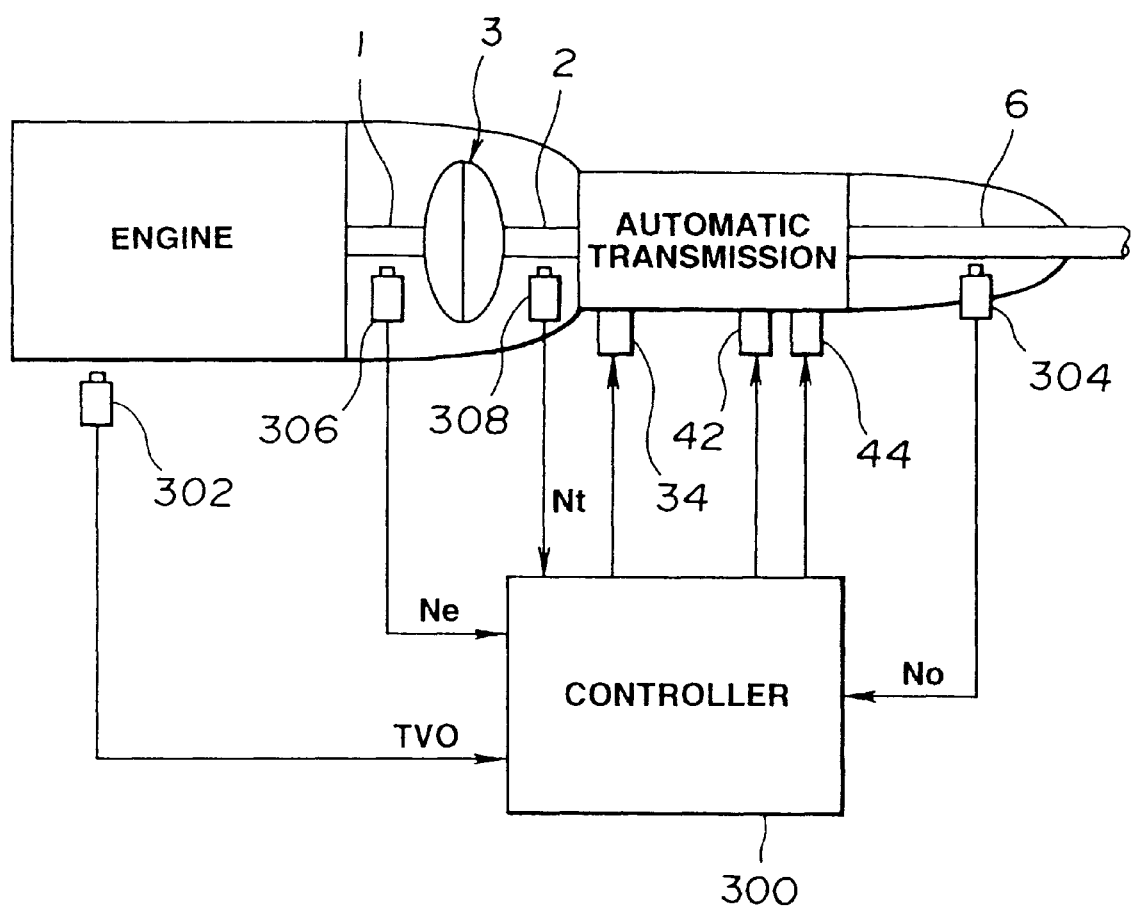
FIG. 4 is a block diagram showing the relationship between the engine, the torque converter, the automatic transmission, and a controller.

FIG. 4 shows the relation between the engine, the torque converter 3, the automatic transmission, and a transmission controller 300. The controller 300 is a microcomputer based controller that includes, as usual, an input/output device (I/O), a central processor unit (CPU), a random access memory (RAM), and a read only memory (ROM).

Via the I/O, the CPU inputs various operating parameters of the engine, torque converter and automatic transmission from signals of sensors and outputs signals for application to the lockup solenoid 34, first shift solenoid 42 and second shift solenoid 44. Among the sensors, there are illustrated a throttle position sensor 302, an output shaft speed sensor 304, an engine speed sensor 306, and a turbine speed sensor 308. These sensors are conventional and thus well known. The throttle position sensor 302 detects position or degree of opening of the engine throttle and generates a signal indicative of the detected throttle opening TVO. The output shaft speed sensor 304 detects revolution of the transmission output shaft 6 and generates a signal indicative of the detected transmission output shaft revolution. The engine speed sensor 306 detects revolution of the engine output shaft 1 and generates a signal indicative of the detected engine revolution. The turbine speed sensor 308 detected revolution of the turbine shaft 2, which serves as a transmission input shaft, and generates signal indicative of the detected turbine shaft revolution. These sensor signals are fed to the controller 300.

The CPU of the controller 300 inputs information of the throttle opening degree TVO from the signal of the throttle position sensor 302. It inputs information of the transmission output shaft speed No by processing the signal of the transmission output shaft sensor 304. This transmission output shaft speed Nc is used as vehicle speed V in arithmetic operations by the controller 300. The CPU inputs information of engine speed Ne by processing the signal of the engine speed sensor 306 and information of the turbine speed Nt from the signal of the turbine shaft revolution sensor 308.

The controller 300 has stored in the ROM thereof a shift scheduling table and a ratio control routine. The CPU of the controller 300 executes the ratio control routine. During the execution of the ratio control routine, the CPU performs calculation of a current speed ration (=Nt/No) and conducts a table look-up operation of the shift scheduling table versus throttle opening degree TVO and vehicle speed V (=No). The shift scheduling table contains a map of speed ratios versus various combinations of values of throttle opening degree TVO and vehicle speed V (=No). Performing the table look-up operations results in providing a desires speed ratio for current combination of values of throttle opening degree TVO and vehicle speed V. The CPU compares the current and desired values of the speed ratio. If the current and desired values of the speed ratio agree with each other, the CPU determines that the current speed ratio is maintained. If the current speed ratio greater than the desired speed ratio, the CPU determines that a shift up to the next adjacent speed ratio is demanded. If the current speed ratio is less than the desired speed ratio, the CPU determines that a shift down to the next adjacent speed ratio is demanded. In accordance with such determination, the CPU outputs command signals to the first and second shift solenoid 42 and 44. In response to the control signals, the first and second shift solenoids 42 and 44 are energized and/or de-energized to establish the desired speed ratio in the automatic transmission.

The basic strategy of lockup clutch control is briefly described. The CPU calculates a current value of slip speed $S_C$, i.e., $$S_C = Ne - Nt,$$

and performs a table look-up operation of a lockup clutch operation mode scheduling (LCOMS) table using the current vehicle speed V, throttle opening degree TVO and desired speed ratio. The LCOMS table contains a map of a plurality of lockup operation modes, which include a slip lockup mode, a complete engagement lockup mode at deceleration, and other lockup modes, versus various combinations of vehicle speed V, throttle opening degree TVO and desired speed ratio. In response to the result of performing the table look-up operation, the CPU of the controller 300 determines which one of the lockup operation modes is demanded. Examples of such LCOMS table are found in U.S. Pat. No. 5,086,894 entitled "LOCKUP CLUTCH CONTROL SYSTEM FOR AUTOMATIC POWER TRANSMISSION", Iizuka et al., issued on Feb. 11, 1992 (see FIG. 4); U.S. Pat. No. 5,219,055 entitled "LOCKUP CLUTCH PRESSURE CONTROL DEVICE", Imamura, issued on Jun. 15, 1993 (see FIG. 4); U.S. Pat. No. 5,588,937 entitled "SLIP CONTROL APPARATUS FOR MOTOR VEHICLE LOCKUP CLUTCH", Kono et al., issued on Dec. 31, 1996 (see FIG. 7); and U.S. Pat. No. 5,643,136 entitled "SLIP CONTROL APPARATUS FOR MOTOR VEHICLE LOCKUP CLUTCH", Kono et al., issued on Jul. 1, 1997 (see FIG. 7).

In response to the result of performing the table look-up operation of the LCOMS table, the CPU performs arithmetic operations to determine a desired value of slip speed $S_D$ for current operating state of the vehicle. Then, the CPU determines a slip error or deviation $S_E$ by calculating subtraction $S_D - S_C$. In order to decrease the deviation $S_E$ toward zero, the CPU performs a feedback control. According to the feedback control, the CPU performs arithmetic operations to determine the lockup clutch engagement force command. Then, the CPU translates the command into duty signal D. The lockup solenoid 34 operates in response to the duty signal D. As mentioned before, for values of duty falling in the window, increasing the duty of the lockup solenoid 34 causes lockup clutch engagement force to increase, while decreasing the duty causes the lockup clutch engagement force to decrease.

Figure 5:
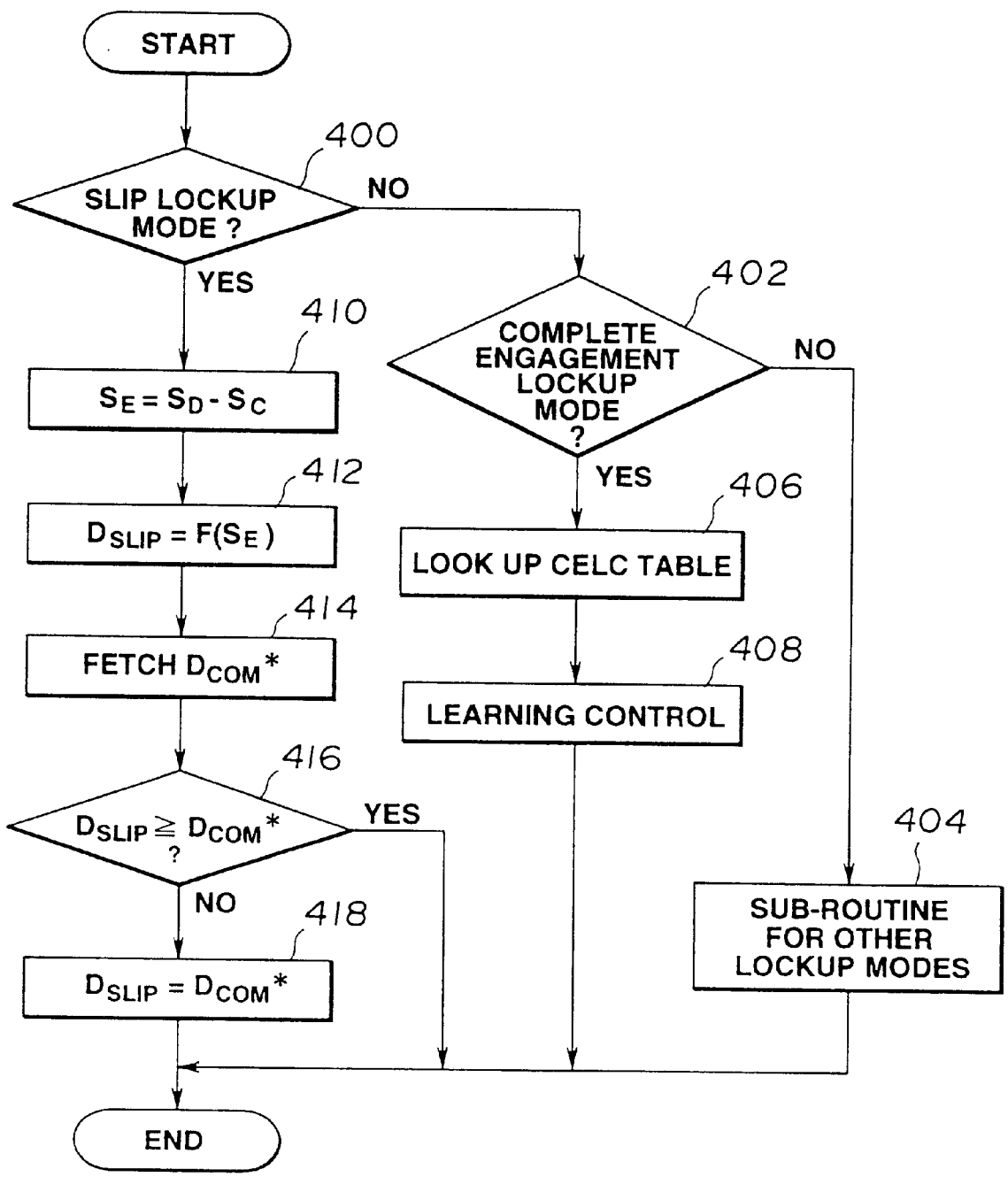
FIG. 5 is a flow chart of a first preferred implementation of the present invention.

FIG. 5 is a flow chart of a lockup clutch control routine illustrating a first preferred implementation of the present invention. The CPU executes this control routine upon elapse of a predetermined period of time.

In FIG. 5, in step 400, the CPU determines whether or not the stored result of the table look-up operation of the LCOMS table indicates slip lockup mode. If this is not the case, the routine proceeds to step 402 where the CPU determines whether or not the stored result indicates complete engagement lockup mode at deceleration. If this is not the case, the routine proceeds to step 404 where the CPU executes sub-routine for other lockup modes.

If the complete engagement lockup mode is selected, the control routine proceeds from step 402 down to step 406. In step 406, the CPU performs a table look-up operation of a complete engagement lockup control (CELC) table to fetch a value of command $D_{COM}$. The CELC table contains values of command $D_{COM}$ mapped over combinations of vehicle speed V, transmission oil temperature and solenoid driving voltage with which the lockup solenoid 34 operates. The table look-up operation of the CELC table is performed using vehicle speed V, transmission oil temperature and solenoid driving voltage. Initially, each mapped value of command $D_{COM}$ in the CELC table is empirically determined such that operating the lockup solenoid 34 with duty translated from the fetched value of command $D_{COM}$ makes the minimum lockup engagement force. The minimum lockup engagement force is the minimum force required to keep the lockup clutch 3L engaged without any slip in the torque converter 3. The corresponding mapped value in the CELC table is subject to alteration after determination that operating the lockup solenoid 34 with duty translated from the fetched value of command $D_{COM}$ fails to accomplish the minimum lockup clutch engagement force. The routine proceeds from step 406 to step 408. In step 408, the CPU executes learning control to evaluate the fetched value of command $D_{COM}$ and alters the corresponding mapped value in the CELC table in response to the result of such evaluation. Specifically, the CPU determines whether or not deviation $S_E$ is zero upon operating the lockup solenoid 34 with duty translated from the fetched value of command $D_{COM}$, and alters the corresponding mapped value in the CELC table in such a direction as to reduce the deviation $S_E$ toward zero. After step 408, the control routine ends. The command $D_{COM}$ is used in an output control routine. In the output control routine, the CPU translates the command $D_{COM}$ into duty and generates duty signal D indicative of the determined duty. The controller 300 applies this duty signal D to the driver of the lockup solenoid 34.

If the slip lockup mode is selected, the control routine proceeds from step 400 down to step 410. In step 410, the CPU determines slip error or deviation $S_E$ of current value $S_C$ of slip speed from the stored desired value $S_D$ thereof by calculating the equation that $$S_E = S_D - S_C.$$

In the next step 412, the CPU determines a value of command $D_{SLIP}$ as a predetermined feedback function of the determined deviation $S_E$. This relation can be expressed by the equation that $$D_{SLIP} = F(S_E),$$

where F represents a feedback function. The control routine proceeds to step 414. In step 414, the CPU fetches the mapped value that has been worked on most recently from the CELC table and stores it as the most recently worked-on value $D_{COM}{}^*$. The control routine proceeds to step 416. In step 416, the CPU determines whether $D_{SLIP}$ is greater than or equal to $D_{COM}{}^*$ ($D_{SLIP} \geq D_{COM}{}^*$) or $D_{SLIP}$ is less than $D_{COM}{}^*$ ($D_{SLIP} < D_{COM}{}^*$). If $D_{SLIP} < D_{COM}{}^*$ holds, the control routine proceeds to step 418. In step 418, the CPU updates $D_{SLIP}$ with $D_{COM}{}^*$. If $D_{SLIP} > D_{COM}{}^*$ holds, the control routine ends. The control routine ends after step 418. In the same manner as mentioned before in connection with $D_{COM}$. The command $D_{SLIP}$ is used in the output control routine. In the output control routine, the CPU translates the command $D_{SLIP}$ into duty and generates duty signal D indicative of the determined duty. The controller 300 applies this duty signal D to the driver of the lockup solenoid 34.

From the preceding description, it is now understood that the controller 300 receives input signals from the sensors 302, 304, 306 and 308 and processes them in accordance with predetermined logic rules to issue, as an output command signal, the duty signal D. A lockup actuator including the lockup solenoid 34 is operative responsive to signal D to adjust lockup clutch engagement force with which the lockup clutch 3L is engaged to commanded value $D_{SLIP}$. The controller 300 determines the command $D_{SLIP}$ as the feedback function F of the deviation $S_E$ (see step 412), and sets a limit to the determined command $D_{SLIP}$ (see steps 416 and 418) during operation of the lockup clutch 3L in the slip lockup mode.

In this implementation as illustrated in FIG. 5, the controller 300 defines the limit by a lower limit value of range of values of lockup clutch engagement force predetermined for operation of the lockup clutch 34 in the slip lockup mode. The controller 300 sets, as the lower limit value, the determined command value that has caused the current value of slip speed $S_C$ to stay zero. The controller 300 sets, as the lower limit value, the determined commanded value $D_{COM}{}^*$ that has caused the lockup actuator to adjust the lockup clutch engagement force to minimum value required to keep the lockup clutch 3L completely engaged during operation in the complete engagement lockup modes at deceleration.

Figure 6:
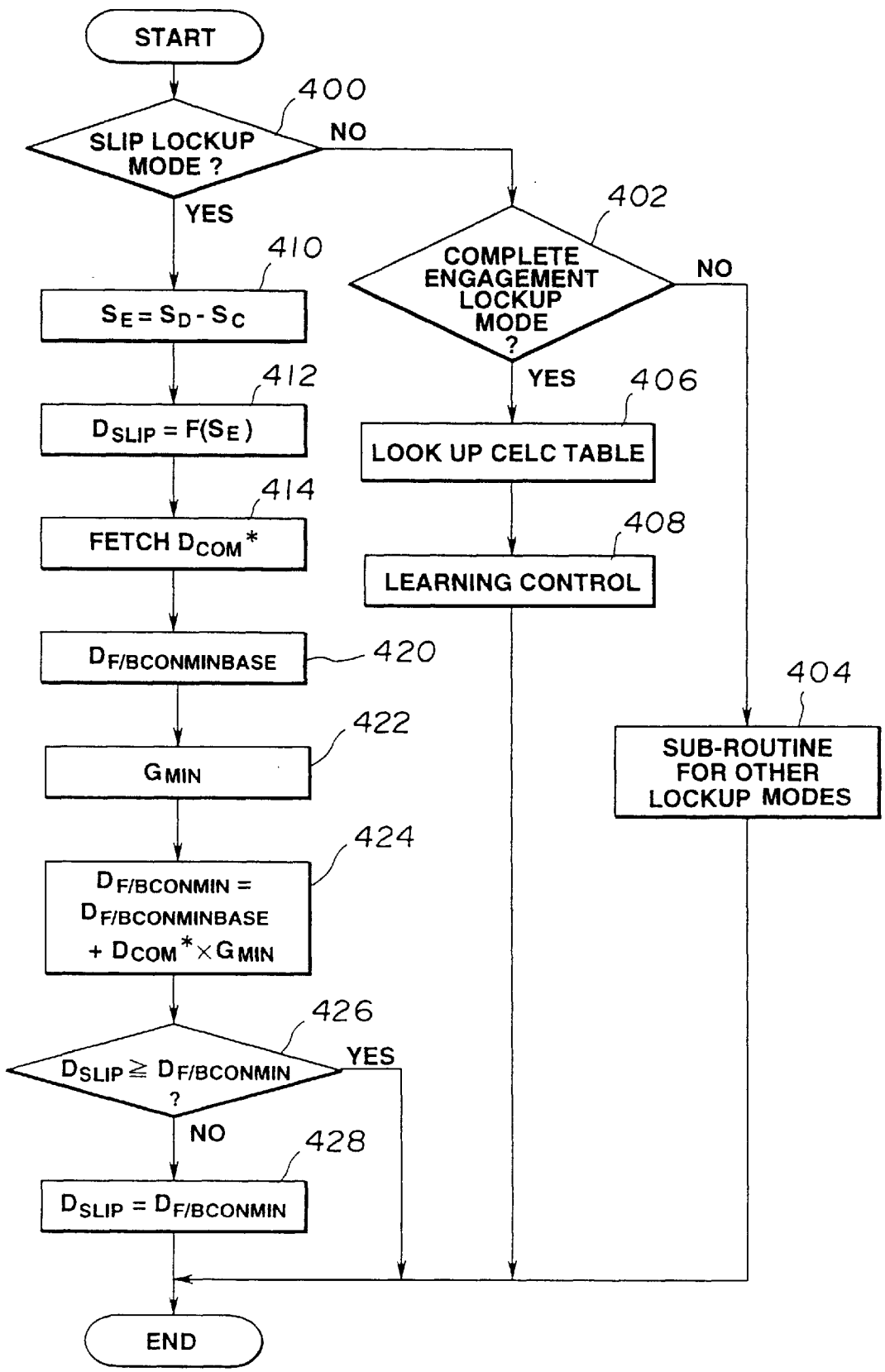
FIG. 6 is a flow chart of a second preferred implementation of the present invention.

FIG. 6 is a flow chart of a lockup clutch control routine illustrating a second preferred implementation of the present invention. This second preferred implementation is substantially the same as the first preferred implementation so that the same or similar steps are designated by the same reference numerals throughout FIGS. 5 and 6. Comparing the flow chart of FIG. 6 with that of FIG. 5 reveals a difference. The difference is that the command $D_{SLIP}$ is compared with $D_{COM}{}^*$ in step 416 and limited thereby in step 418 in FIG. 5, while, in FIG. 6, it is compared in step 426 with a F/B control minimum $D_{F/BCONMIN}$ and limited thereby in step 428. $D_{F/BCONMIN}$ results from altering a F/B control minimum base $D_{F/BCONMINBASE}$ by a product of $D_{COM}{}^*$ and a correction gain $G_{MIN}$.

The minimum base $D_{F/BCONMINBASE}$ corresponds to lockup clutch engagement force that is needed to induce a desired value of slip speed $S_P$ that is determined as a function of vehicle speed V. The minimum base $D_{F/BCONMINBASE}$ is determined as a function of desired value of slip speed. The desired values of slip speed are predetermined against combinations of vehicle speed, transmission oil temperature and solenoid driving voltage. There is a table in which values of the minimum based $D_{F/BCONMINBASE}$ are mapped over combinations of vehicle speed, transmission oil temperature and solenoid driving voltage. Thus, using vehicle speed, transmission oil temperature and solenoid driving voltage, the CPU performs, in step 420, a table look-up operation of this table to determine the minimum base $D_{F/BCONMINBASE}$.

As is well known, there is a linear relationship between the duty of the lockup solenoid 34 and the lockup clutch engagement force induced. This relationship is not fixed and subject to alteration in response to transmission oil temperature and solenoid driving voltage with which the lockup solenoid 34 is energized. A change in duty of the lockup solenoid 34 per unit amount of change in lockup clutch engagement force is subject to such alteration. In other words, a gain of the duty of the lockup solenoid is subject to such alteration. There is provided a table in which appropriate values of the gain are mapped over various combinations of transmission oil temperature and solenoid driving voltage. In step 422, the CPU performs a table look-up operation of this table using transmission oil temperature and solenoid driving voltage and sets the result as the before mentioned correction gain $G_{MIN}$.

In step 424, the CPU determines the F/B control minimum $D_{F/BCONMIN}$ by calculating the equation as follows:

$$D_{F/BCONMIN} = D_{F/BCONMINBASE} + D_{COM}{}^* \times G_{MIN}.$$

Thus, the control routine of FIG. 6 is different from that of FIG. 5 in the provision of steps 420, 422, 424 and 426 instead of step 416.

According to the first and second preferred implementations of the present invention, the command $D_{SLIP}$ is compared with $D_{COM}{}^*$ (see step 416 in FIG. 5) or $D_{F/BCONMIN}$ (see step 426 in FIG. 6), and the lower limit of $D_{SLIP}$ is defined by $D_{COM}{}^*$ or $D_{F/BCONMIN}$. Illustrating in plain words, the lower limit of the lockup clutch engagement force for the slip lockup mode is defined by $D_{COM}{}^*$ that is indicative of the minimum lockup engagement force for complete engagement at deceleration in the first preferred implementation of the present invention. In the second preferred implementation of the present invention, the lower limit of the lockup clutch engagement force for the slip lockup mode is defined by the F/B control minimum $D_{F/BCONMIN}$. The F/B control minimum $D_{F/BCONMIN}$ is given by incrementing the F/B control minimum base $D_{F/BCONMINBASE}$ by the product of $D_{COM}{}^*$ and $G_{MIN}$.

According to the first and second preferred implementations, the comparing process and the subsequent restraining process proceed after calculating the feedback function $F(S_E)$ in step 412.

Figure 7:
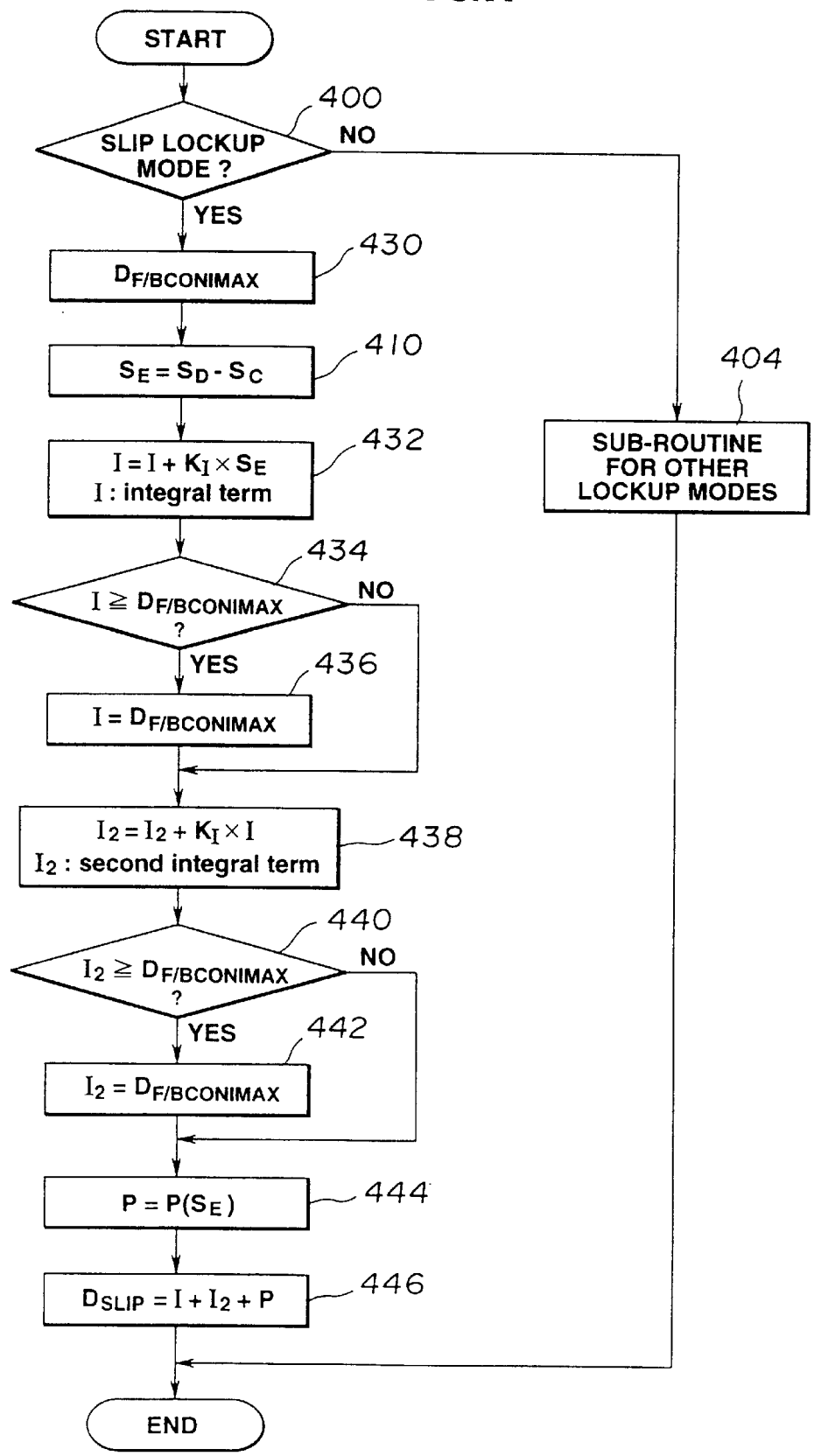
FIG. 7 is a flow chart of a third preferred implementation of the present invention.

In the third and fourth implementations of the present invention in FIGS. 7 and 8, an integral term I, which is equivalent to time integral of $S_E$, of the feedback function F is subject to the comparison process and the subsequent restraining process.

FIG. 7 is a flow chart illustrating the third preferred implementation of the present invention. For the sake of simplicity in comparing FIG. 7 with FIG. 6, the same steps are indicated by the common reference numerals throughout FIGS. 6 and 7.

In FIG. 7, the control routine proceeds from step 400 to step 430. In step 430, the CPU performs a table look-up operation of a table using vehicle speed, transmission oil temperature and lockup solenoid driving voltage. This table, stored in the ROM, contains values of F/B control integral maximum $D_{F/BCONIMAX}$ against combinations of vehicle speed, transmission oil temperature and lockup solenoid driving voltage. These values in the table correspond to the values of lockup clutch engagement force that are required to accomplish desired values of slip speed. The slip speed is determined as a function of vehicle speed.

The control routine proceeds to step 410 where the CPU determines a deviation $S_E$ by subtracting a current value of slip speed $S_C$ from a desired value of slip speed $S_D$. In the next step 432, the CPU updates integral term I of a feedback control by adding the product of an integral gain $K_I$ and the deviation $S_E$ to a stored old value $I_{OLD}$ of I to give a new value $I_{NEW}$ as a substitute of the old value. Then, the control routine proceeds to step 434. In step 434, the CPU determines whether or not the integral term I has exceeded a F/B control integral maximum $D_{F/BCONIMAX}$. If this is the case, the CPU sets, in step 436, the integral maximum $D_{F/BCONIMAX}$ as the integral term I. If this is not the case, the integral term I that has been determined in step 432 is unaltered and used as it is in the following procedures. Thus, the control routine passes step 436 and proceeds directly to step 438 from step 434.

In step 438, the CPU updates second integral term $I_2$ by adding the product of integral gain $K_I$ and integral term I to a stored old value $I_{2OLD}$ of $I_2$ to give a new value $I_{2NEW}$ as a substitute of the old value. Then, the control routine proceeds to step 440. In step 440, the CPU determines as to whether or not the second integral term $I_2$ has exceeded the F/B control integral maximum $D_{F/BCONIMAX}$. If this is the case, the CPU sets, in step 442, the integral maximum $D_{F/BCONIMAX}$ as the second integral term $I_2$. If this is not the case, the second integral term $I_2$ that has been determined in step 438 is unaltered and used as it is in the following procedures. Thus, the control routine passes step 442 and proceeds directly to step 444 from step 440.

In step 444, the CPU performs a sub-routine to determine other term or terms P of the feedback control. They may include a proportional term of deviation $S_E$ and a derivative term thereof. The control routine proceeds from step 444 to step 446. In step 446, the CPU calculates the sum of I, $I_2$, and P and sets the result of summation as command $D_{SLIP}$. In the present embodiment, an inverse proportional relation exists between the command $D_{SLIP}$ and duty. Thus, a function reflecting this inverse proportional relation is used in translating the command $D_{SLIP}$ into the duty. The controller 300 generates the duty signal D indicative of the determined duty.

From the preceding description in connection with FIG. 7, it is now understood that the F/B control integral maximum $D_{F/BCONIMAX}$ defines the upper limit of both integral terms I and $I_2$. this prevents the command $D_{SLIP}$ from increasing excessively. Thus, even if the deviation $S_E$ continues to exist when the actual value of slip speed $S_C$ is around zero (0) in slip lockup mode, the lockup clutch 3L is held in standby state. In other words, the torque converter 3 is prevented from shifting to its converter state where the lockup clutch 3L is completely disengaged during its operation in slip lockup mode.

Let us now consider the feedback function F which can be expressed by an equation including a proportional term P, a derivative term D, an integral term I, the second integral term $I_2$, and nth integral term $I_n$, where n is a natural number. When the vehicle travels with very low load, a current value of slip speed $S_C$ persists to stay in the neighborhood of zero but not zero during operation of the lockup clutch 3L in slip lockup mode. In this circumstance, if a desired value of slip speed $S_D$ is 0 (zero), a deviation $S_E$ continues to exist. This deviation is very small. Thus, the proportional and derivative terms P and D are small and thus negligible, but the integral terms I, $I_2$, and $I_n$ gradually grow. As they grow, the duty of the lockup solenoid 34 decreases, resulting in reduction of lockup clutch engagement force. Thus, according to the third implementation of the invention shown in FIG. 7, the terms I, $I_2$, and $I_n$ that gradually grow under the above-mentioned condition are restrained from growing beyond a limit (see steps 434, 436, 440 and 442 in FIG. 7). In other words, neglecting the proportional and derivative terms P and D, setting the limit to the integral terms I, $I_2$, and $I_n$ is nothing but setting the limit to the command $D_{SLIP}$. As $D_{F/BCONIMAX}$ defines the limit, it can be said that $D_{F/BCONIMAX}$ defines a lower limit value of range of values of lockup clutch engagement force available during operation of the lockup clutch 3L in slip lockup mode when the vehicle travels with very low load. If desired, the maximum of values in a lower dead band adjacent the lower limit of command may be an alternative candidate as the limit to be set to the integral terms.

FIG. 8 is a flow chart illustrating the fourth preferred implementation of the present invention. The control routine of FIG. 8 is substantially the same as the control routine of FIG. 6 in that both of them employ steps 400, 402, 404, 406 and 408. Thus, description as to these steps is hereby omitted for the sake of simplicity. The control routine of FIG. 8 is similar to the control routine of FIG. 6 in that steps 414, 420A, 422A, and 424A of FIG. 8 are similar to steps 414, 420, 422, and 424 of FIG. 6, respectively. Further, the control routine of FIG. 8 is similar to the control routine of FIG. 7 in that steps 410, 432, 434, 436, 444, and 446A of FIG. 8 are similar to steps 410, 432, 434, 436, 444, and 446 of FIG. 7.

In step 414 of FIG. 8, the CPU fetches the mapped value that has been worked on most recently from the CELC table and stores it as the most recently worked on value $D_{COM}^*$.

Values of the F/B control integral maximum base $D_{F/BCONIMAXBASE}$ correspond to values of lockup clutch engagement force that are required to accomplish desired values of slip speed $S_D$. The maximum base $D_{F/BCONIMAXBASE}$ is determined as a function of vehicle speed, transmission oil temperature and lockup solenoid driving voltage. There is provided a table in which appropriate values of the maximum base $D_{F/BCONIMAXBASE}$ are mapped against combinations of vehicle speed, transmission oil temperature and lockup solenoid driving voltage. Thus, using vehicle speed, transmission oil temperature and solenoid driving voltage, the CPU performs, in step 420A, a table look-up operation of the table to determine the maximum base $D_{F/BCONIMAXBASE}$.

As is well known, there is a linear relationship between the duty of the lockup solenoid 34 and the lockup clutch engagement force induced. This relationship is not fixed and subject to alteration in response to transmission oil temperature and voltage with which the lockup solenoid 34 is energized. A change in solenoid duty D per unit amount of change in lockup clutch engagement force is subject to such alteration. In other words, a gain of the soleoid duty D is subject to such alteration. There is provided a table in which appropriate values of the gain are mapped over various combinations of transmission oil temperature and solenoid driving voltage. In step 422A, the CPU performs a table look-up operation of this table using transmission oil temperature and solenoid driving voltage and sets the result a correction gain $G_{MAX}$.

The control routine proceeds from step 422A to step 424A. In step 424A, the CPU determines F/B control integral maximum $D_{F/BCONIMAX}$ by calculating the equation as follows:

$$D_{F/BCONIMAX}=D_{F/BCONIMAXBASE}+D_{COM}^*\times G_{MAX}.$$

In step 410, the CPU determines the deviation $S_E$ by calculating the equation that $S_E=S_D-S_C$. In the next step 432, the CPU updates integral term I of a feedback control by adding the product of an integral gain $K_I$ and the deviation $S_E$ to a stored old value $I_{OLD\ of\ I\ to\ give\ a\ new\ value}$ $I_{NEW}$ as a substitute of the old value. Then, the control routine proceeds to step 434. In step 434, the CPU determines as to whether or not the integral term I has exceeded F/B control integral maximum $D_{F/BCONIMAX}$. If this is the case, the CPU sets, in step 436, the integral maximum $D_{F/BCONIMAX}$ as the integral term I. If this is not the case, the integral term I that has been determined in step 432 is unaltered and used as it is in the following procedures. Thus, the control routine passes step 436 and proceeds directly to step 444 from step 434.

In step 444, the CPU performs a sub-routine to determine other term or terms P of the feedback control. They may include a proportional term of deviation $S_E$ and a derivative term thereof. The control routine proceeds from step 444 to step 446A. In step 446A, the CPU calculates the sum of I, and P and sets the result of summation as command $D_{SLIP}$.

Steps 414, 420A, 422A, and 424A of FIG. 8 correspond to step 430 of FIG. 7 in giving the F/B control integral maximum $D_{F/BCONIMAX}$.

In the third and fourth implementations of the present invention, the slip speed is inversely proportional to the duty that is inversely proportional to command resulting from calculation in step 445 or 445A. In other words, the slip speed is proportional to the command resulting from summation of I, $I_2$, and P (see step 446 in FIG. 7) or summation of P and I (see step 446A in FIG. 8). This is because the lockup solenoid 34 is energized to open the drain port of the pressure line 97 and duty is indicative of a percentage of time duration in which the lockup solenoid 34 is energized during unit period of time.

If duty of the lockup solenoid 34 is indicative of a percentage of time duration in which the lockup solenoid 34 is not energized during unit period of time, the sip speed is proportional to the duty. In this case, the duty is set as being proportional to the command resulting from summation of I, $I_2$, and P (see step 446 in FIG. 7) or summation of P and I (see step 446A in FIG. 8).

Let us consider the case in which the drain port of the pressure line 97 (see FIG. 1A) is opened when a lockup solenoid is not energized and closed when it is energized. If the duty of the solenoid is indicative of a percentage of time duration in which the lockup solenoid is energized to close the drain port of the pressure line 97 during unit period of time, the slip speed is proportional to the duty. To adjust the control routine of FIG. 7 or FIG. 8 to this new situation, the slip deviation $S_E$ is set as a result of subtraction of $S_D$ from $S_C$ and the integral term I and/or the second integral term $I_2$ are restrained from decreasing infinitely.

In the control routine of FIG. 7, the first and second integral terms I and $I_2$ are employed as control terms of the feedback control. Besides, the common F/B control integral maximum $D_{F/BCONIMAX}$ is used for the integral terms for smooth change in the command. If desired, the feedback control may include the first, the second, . .. . and the nth integral terms as its control terms, where: n is a natural number. In this case, different values may be set as integral maximum of the integral terms. However, it is advantageous to use a single value as the F/B control integral maximum $D_{F/BCONIMAX}$ for all of the integral terms for smooth change in the command.

In step 432 of the control routine of FIG. 7 or 8, the integral term I may be updated by multiplying the integral gain $K_I$ with the sum of I and $S_E$. However, if the integral gain $K_I$ is subject to frequent change, it is advantageous to update the integral term I by adding the product of $K_I$ and $S_E$ to I as shown in step 432.

In each of the preferred implementations of the present invention, it is preferred that the controller 300 keeps the determined command $D_{SLIP}$ unaltered until completion of shift from slip lockup mode to complete engagement lockup mode for vehicle operation at deceleration.

What is claimed is:

1. A lockup control system for a vehicle power train including an internal combustion engine; an automatic transmission; a torque converter interposed between the engine and the transmission; a torque converter lockup clutch interposed between the engine and transmission and having a complete engagement lockup mode for vehicle operation during deceleration wherein the lockup clutch is completely engaged to prevent the torque converter from slipping, and a slip lockup mode wherein the lockup clutch is incompletely engaged to restrain the torque converter from slipping; sensors providing input signals indicative of vehicle power train operating parameters; a controller receiving the input signals and processing the same in accordance with predetermined logic rules to issue an output command signal; and a lockup actuator operative responsive to the output command signal to adjust lockup clutch engagement force with which the lockup clutch is engaged to a commanded value, wherein:

the controller determines the commanded value as a function of a deviation between a current value of slip speed within the torque converter and a desired value thereof;

the controller sets a limit to the determined commanded value during operation of the lockup clutch in the slip lockup mode;

wherein said controller defines said limit by a lower limit value of a range of values of lockup clutch engagement force predetermined for operation of the lockup clutch in the slip lockup mode.

2. A lockup control system as claimed in claim 1, wherein said controller sets, as said lower limit for the determined commanded value, a value that has caused the current value of slip speed to stay zero.

3. A lockup control system as claimed in claim 1, wherein said controller keeps said determined commanded value unaltered until completion of a shift from operation of the lockup clutch in the slip lockup mode to operation of the lockup clutch in complete engagement lockup mode for vehicle operation during deceleration.

4. A lockup control system as claimed in claim 2, wherein, during operation of the lockup clutch in the lockup slip mode, said controller sets, as said lower limit for the determined commanded value, a value that has caused the lockup actuator to adjust the lockup clutch engagement force to the minimum value required to keep the lockup clutch completely engaged during operation of the lockup clutch in the complete engagement lockup mode for operation of the vehicle during deceleration.

5. A lockup control system as claimed in claim 4, wherein, during operation of the lockup clutch in the complete engagement lockup mode for operation of the vehicle during deceleration, the controller performs a learning control to modify the determined commanded value in such a direction as to reduce the current value of slip speed toward zero.

6. A lockup control system as claimed in claim 1, wherein, during operation of the lockup clutch in the lockup slip mode, said controller determines a F/B control minimum base as a function of a desired value of slip speed that is predetermined for a current value of vehicle speed, modifies said determined F/B control minimum base by the product of a gain and a determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration to create a modification result, and sets the modification result as said lower limit value.

7. A lockup control system as claimed in claim 6, wherein, during operation of the lockup clutch in the slip lockup mode, said controller modifies the determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration, by an offset from the F/B control minimum base that has been determined as a function of a desired value of slip speed that is predetermined for a current value of vehicle speed.

8. A lockup control method for a vehicle power train including an internal combustion engine; an automatic transmission; a torque converter interposed between the engine and the transmission; a torque converter lockup clutch interposed between the engine and transmission and having a complete engagement lockup mode for vehicle operation during deceleration wherein the lockup clutch is completely engaged to prevent the torque converter from slipping, and a slip lockup mode wherein the lockup clutch is incompletely engaged to restrain the torque converter from slipping; sensors providing input signals indicative of vehicle power train operating parameters; a controller receiving the input signals and processing the same in accordance with predetermined logic rules to issue an output command signal; and a lockup actuator operative responsive to the output command signal to adjust a lockup clutch engagement force with which the lockup clutch is engaged to a commanded value, said control method comprising the steps of:

determining the commanded value as a function of a deviation between a current value of slip speed within the torque converter and a desired value thereof; and setting a limit to the determined commanded value during operation of the lockup clutch in the slip lockup mode;

wherein said limit is defined by a lower limit value of a range of values of lockup clutch engagement force predetermined for operation of the lockup clutch in the slip lockup mode.

9. A lockup control method as claimed in claim 8, wherein there is set, as said lower limit for the determined commanded value, a value that has caused the current value of slip speed to stay zero.

10. A lockup control method as claimed in claim 8, including the step of keeping said determined commanded value unaltered until completion of a shift from operation of the lockup clutch in the slip lockup mode for operation of the lockup clutch in complete engagement lockup mode for vehicle operation at deceleration.

11. A lockup control method as claimed in claim 8, wherein, during operation of the lockup clutch in the lockup slip mode, there is set, as said lower limit for the determined commanded value, a value that has caused the lockup actuator to adjust the lockup clutch engagement force to the minimum value required to keep the lockup clutch completely engaged during operation of the lockup clutch in the complete engagement lockup mode for operation of the vehicle during deceleration.

12. A lockup control method as claimed in claim 11, wherein, during operation of the lockup clutch in the complete engagement lockup mode for operation of the vehicle during deceleration, there is performed a learning control to modify the determined commanded value in such a direction as to reduce the current value of slip speed toward zero.

13. A lockup control method as claimed in claim 8, including the steps, during operation of the lockup clutch in the lockup slip mode, of:

determining a F/B control minimum base as a function of a desired value of slip speed that is predetermined for a current value of vehicle speed;

modifying said determined F/B control minimum base by the product of a gain and a determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration to create a modification result; and setting the modification result as said lower limit value.

14. A lockup control method as claimed in claim 13, including the steps, during operation of the lockup clutch in the slip lockup mode, of:

modifying the determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration, by an offset from the F/B control minimum base that has been determined as a function of a desired value of slip speed that is predetermined for a current value of vehicle speed.

15. A lockup control system for a vehicle power train including an internal combustion engine; an automatic transmission; a torque converter interposed between the engine and the transmission; a torque converter lockup clutch interposed between the engine and transmission and having a complete engagement lockup mode for vehicle operation during deceleration wherein the lockup clutch is completely engaged to prevent the torque converter from slipping, and a slip lockup mode wherein the lockup clutch is incompletely engaged to restrain the torque converter from slipping; sensors providing input signals indicative of vehicle power train operating parameters; a controller receiving the input signals and processing the same in accordance with predetermined logic rules to issue an output command signal; and a lockup actuator operative responsive to the output command signal to adjust lockup clutch engagement force with which the lockup clutch is engaged to a commanded value, wherein:

the controller determines the commanded value as a function of a time integral of a deviation between a current value of slip speed within the torque converter and a desired value thereof;

the controller sets a limit to the time integral during operation of the lockup clutch in the slip lockup mode.

16. A lockup control system as claimed in claim 15, wherein, when said devlation continues to stay in the neighborhood of zero excluding zero, setting the limit to the time integral results in providing the maximum of a range of values that constitute a dead band adjacent the lower limit value of range of values of lockup clutch engagement force predetermined for operation of the lockup clutch in the slip lockup mode.

17. A lockup control system as claimed in claim 15, wherein, when said deviation continues to stay in the neighborhood of zero excluding zero, setting the limit to the time integral results in providing the determined commanded value that has caused the current value of slip speed to stay zero.

18. A lockup control system as claimed in claim 15, wherein said controller keeps said determined commanded value unaltered until completion of a shift from operation of the lockup clutch in the slip lockup mode to operation of the lockup clutch in complete engagement lockup mode for vehicle operation at deceleration.

19. A lockup control system as claimed in claim 15, wherein, during operation of the lockup clutch in the lockup slip mode, when said deviation continues to stay in the neighborhood of zero excluding zero, setting the limit to the time integral results in providing, as a lower limit for the determined commanded value, a value that has caused the lockup actuator to adjust the lockup clutch engagement force to the minimum value required to keep the lockup clutch completely engaged during operation of the lockup clutch in the complete engagement lockup mode for operation of the vehicle during deceleration.

20. A lockup control system as claimed in claim 19, wherein, during operation of the lockup clutch in the complete engagement lockup mode for operation of the vehicle during deceleration, the controller performs a learning control to modify the determined commanded value in such a direction as to reduce the current value of slip speed toward zero.

21. A lockup control system as claimed in claim 15, wherein, during operation of the lockup clutch in the lockup slip mode, said controller determines a F/B control integral maximum base as a function of a desired value of slip speed that is predetermined for a current value of vehicle speed, modifies said determined F/B control integral maximum base by the product of a gain and a determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration to create a modification result and sets the modification result as said limit.

22. A lockup control system as claimed in claim 21, wherein, during operation of the lockup clutch in the slip lockup mode, said controller modifies the determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration, by an offset from the F/B control integral maximum base that has been determined as a function of a desired value of slip speed that is predetermined for a current value of vehicle speed.

23. A lockup control system as claimed in claim 15, wherein said controller defines said limit by a value that corresponds to a value of lockup clutch engagement force, which is required to accomplish a desired value of slip speed that is determined against a current value of vehicle speed for operation of the lockup clutch in the slip lockup mode.

24. A lockup control system as claimed in claim 23, wherein, said time integral includes a term of an equation, which expresses the function, that remains when the deviation is zero.

25. A lockup control system as claimed in claim 24, wherein the term of the equation that remains when the deviation is zero involves an integral term of the deviation.

26. A lockup control method for a vehicle power train including an internal combustion engine; an automatic transmission; a torque converter interposed between the engine and the transmission; a torque converter lockup clutch interposed between the engine and transmission and having a complete engagement lockup mode for vehicle operation at deceleration wherein the lockup clutch is completely engaged to prevent the torque converter from slipping, and a slip lockup mode wherein the lockup clutch is incompletely engaged to restrain the torque converter from slipping; sensors providing input signals indicative of vehicle power train operating parameters; a controller receiving the input signals and processing the same in accordance with predetermined logic rules to issue an output command signal; and a lockup actuator operative responsive to the output command signal to adjust lockup clutch engagement force with which the lockup clutch is engaged to a commanded value, the lockup control method comprising the steps of:

determining the commanded value as a function of a time integral of a deviation between a current value of slip speed within the torque converter and a desired value thereof; and setting a limit to the time integral during operation of the lockup clutch in the slip lockup mode.

27. A lockup control method as claimed in claim 26, wherein, when said deviation continues to stay in the neighborhood of zero excluding zero, setting the limit to the time integral results in providing the maximum of a range of values that constitute a dead zone adjacent the lower limit value of a range of values of lockup clutch engagement force predetermined for operation of the lockup clutch in the slip lockup mode.

28. A lockup control method as claimed in claim 26, wherein, when said deviation continues to stay in the neighborhood of zero excluding zero, setting the limit to the time integral results in providing the determined commanded value that has caused the current value of slip speed to stay zero.

29. A lockup control method as claimed in claim 26, including the step of:

keeping said determined commanded value unaltered until completion of a shift from operation of the lockup clutch in the slip lockup mode for operation of the lockup clutch in complete engagement lockup mode for vehicle operation at deceleration.

30. A lockup control method as claimed in claim 26, wherein, during operation of the lockup clutch in the lockup slip mode, when said deviation continues to stay in the neighborhood of zero excluding zero, setting the limit to the time integral results in providing, as a lower limit for the determined commanded value, a value that has caused the lockup actuator to adjust the lockup clutch engagement force to the minimum value required to keep the lockup clutch completely engaged during operation of the lockup clutch in the complete engagement lockup mode for operation of the vehicle during deceleration.

31. A lockup control method as claimed in claim 30, including, during operation of the lockup clutch in the complete engagement lockup mode for operation of the vehicle during deceleration, the step of:

performing a learning control to modify the determined commanded value in such a direction as to reduce the current value of slip speed toward zero.

32. A lockup control method as claimed in claim 26, including, during operation of the lockup clutch in the lockup slip mode, the steps of:

determining a F/B control integral maximum base as a function of a desired value of slip speed that is predetermined for a current value of vehicle speed;

modifying said determined F/B control integral maximum base by the product of a gain and a determined commanded value, which has caused the lockup actuator to adjust the lockup clutch engagement force to the minimum value required to keep the lockup clutch completely engaged during operation of the lockup clutch in the complete engagement lockup made for operation of the vehicle during deceleration create a modification result; and setting the modification result as said limit.

33. A lockup control method as claimed in claim 32, including, during operation of the lockup clutch in the slip lockup mode, the step of:

modifying the determined commanded value, which has caused the lockup actuator to adjust the lockup clutch engagement force to the minimum value required to keep the lockup clutch completely engaged during operation of the lockup clutch in the complete engagement lockup mode for operation of the vehicle during deceleration, by an offset from the F/B control integral maximum base that has been determined as a function of a desired value of slip speed that is predetermined for a current value of vehicle speed.

34. A lockup control method as claimed in claim 26, wherein said limit is defined by a value that corresponds to a value of lockup clutch engagement force, which is required for accomplishing a value of slip speed that is determined against a current value of vehicle speed for operation of the lockup clutch in the slip lockup mode.

35. A lockup control method as claimed in claim 34, wherein, said time integral includes a term of an equation, which expresses the function, that remains when the deviation is zero.

36. A lockup control method as claimed in claim 35, wherein the term of the equation that remains when the deviation is zero involves an integral term of the deviation.

* * * * *